United States Patent
Stevens

[15] 3,659,904
[45] May 2, 1972

[54] NON-SKID BRAKING SYSTEM FOR VEHICLES

[72] Inventor: Fred C. Stevens, 1 Garrett Place, Bronxville, N.Y. 10708

[22] Filed: June 23, 1970

[21] Appl. No.: 49,100

[52] U.S. Cl. .................. 303/21 CG, 188/181 A, 303/10, 303/20, 303/21 CF, 303/21 F
[51] Int. Cl. ........................................................ B60t 8/12
[58] Field of Search .................. 188/181; 303/20, 10, 21; 307/109; 317/5; 324/160, 161; 328/71, 151; 340/263

[56] References Cited

UNITED STATES PATENTS

| | | | |
|---|---|---|---|
| 3,245,213 | 4/1966 | Thompson et al. | 303/21 EB |
| 3,017,145 | 1/1962 | Yarber | 303/21 P |
| 3,245,727 | 4/1966 | Anderson et al. | 303/21 EB |
| 3,522,973 | 8/1970 | Klein et al. | 303/21 R |
| 3,494,671 | 2/1970 | Slavin et al. | 303/21 P |
| 3,521,934 | 7/1970 | Leiber | 303/21 F |
| 3,260,555 | 7/1966 | Packer | 303/21 EB |
| 3,450,444 | 6/1969 | Ballard | 303/21 EB |
| 3,467,444 | 9/1969 | Leiber | 303/21 BE |

*Primary Examiner*—Milton Buchler
*Assistant Examiner*—Stephen G. Kunin
*Attorney*—Nathaniel L. Leek

[57] ABSTRACT

A series of electrical impulses is generated by a set of stationary coils and magnets rotating with the vehicle wheel and is fed to a differential amplifier in such a manner that the output is proportional to variations in amplitude of successive pulses. This output signal is used to interrupt the supply of brake fluid pressure to the wheel brake cylinder and thus prevent further build up of brake pressure when the pulse variation indicates incipient skid conditions. Also the fluid pressure is reduced by being bled off into an accumulator cylinder when the pulse amplitude indicates that the wheel has substantially ceased rotating.

7 Claims, 4 Drawing Figures

INVENTOR.
FRED C. STEVENS
BY
*A S Leek*
ATTORNEY

INVENTOR.
FRED C. STEVENS
BY N S Leek
ATTORNEY

NON-SKID BRAKING SYSTEM FOR VEHICLES

This invention relates to non-skid braking systems for vehicles and has for an object to provide a system in which the brake fluid pressure is automatically limited when the rotational speed of a wheel begins to decrease at a rate at which incipient skid conditions are indicated.

A further object is to provide an automatic mechanism for preventing further increase in brake fluid pressure when such incipient skid conditions are reached.

Another object is to provide a mechanism, in a system of the above type, for reducing the brake fluid pressure if the wheel should tend to become locked as in the case where ice is suddenly encountered during braking.

Another object is to provide a system of the above type which is relatively simple in form and which is readily adapted for commercial installation and use.

Various other objects and advantages will be apparent as the nature of the invention is more fully disclosed.

In accordance with the present invention a series of electrical pulses are produced by the rotation of a wheel. The intensity of the pulses varies with the speed of rotation so that a decrease in intensity of successive pulses beyond a predetermined value indicates that the wheel is decelerating at a rate which indicates incipient skid conditions.

Successive pulses are passed through a circuit including a differential amplifier which responds to a pulse difference greater than a predetermined value. The differential amplifier is connected to actuate a valve for cutting off the brake fluid line and preventing further increase in brake fluid pressure from being applied to the wheel brake cylinder. The pressure is thus limited to a value such that the wheel does not decelerate at a rate which would produce skid conditions.

In addition to the above circuit a further control is provided which responds to the absence of substantial pulses, a condition indicating that the wheel has substantially stopped rotating. When this occurs a portion of the brake fluid is bled off from the wheel brake cylinder so as to reduce the brake pressure to a value such that the wheel is again allowed to rotate. The system thus limits the brake fluid pressure when necessary and reduces the brake fluid pressure when necessary to avoid skid conditions.

The nature of the invention and its method of application will be better understood from the following description, taken in connection with the accompanying drawings in which a specific embodiment has been set forth for purposes of illustration.

Figure 2:
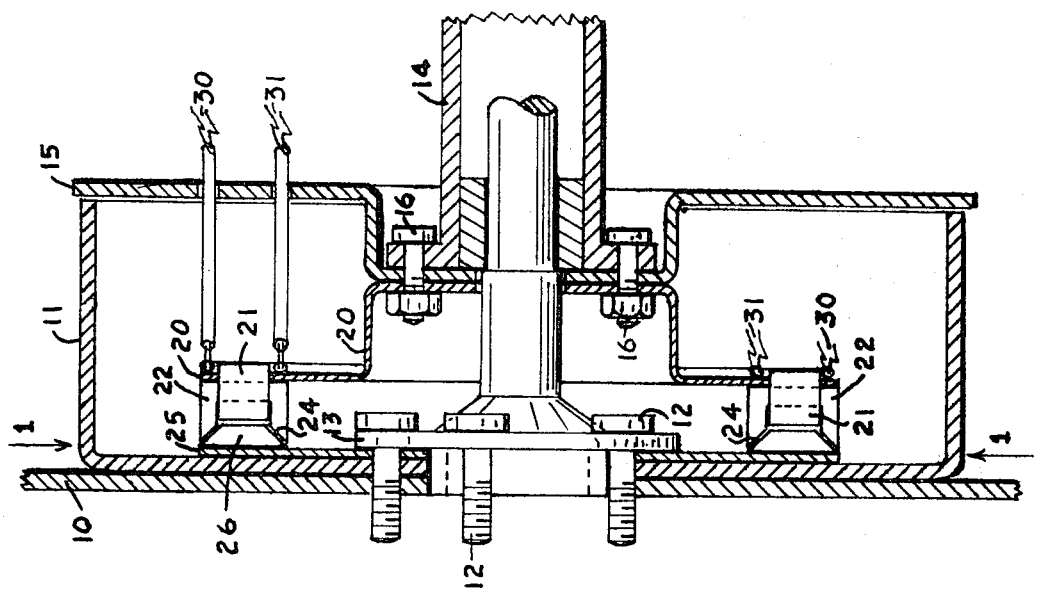
FIG. 2 is a section taken on the line 2—2 of FIG. 1.

Referring to the drawings more in detail the system is shown as applied to a wheel 10 of an automobile or the like, having a brake drum 11 and secured by bolts 12 to an axle hub 13. The usual brake shoes and other details of the wheel mechanism have been omitted for clarity.

The usual brake backing plate 15 is attached to the axle housing 14 by bolts 16. A cupped disc 20 carrying a set of peripherally spaced coils 21 having cores 22 is also carried by bolts 16 and is spaced radially inward of the brake shoes (not shown). The cores 22 have poles 24 facing the wheel for the purpose to be described.

A disc 25 carrying a set of permanent magnets 26 corresponding in number and spacing to alternate coils 21 is fixed to the hub 13 by the bolts 12.

The arrangement is such that an impulse is produced in each coil 21 when a permanent magnet 26 passes the poles 24 of each coil 21. The amplitude of the pulses of electrical energy thus produced will be directly proportional to the speed of rotation of the wheel and magnets and the decrease in level of successive pulses will indicate the rate of deceleration of the wheel.

Figure 3:
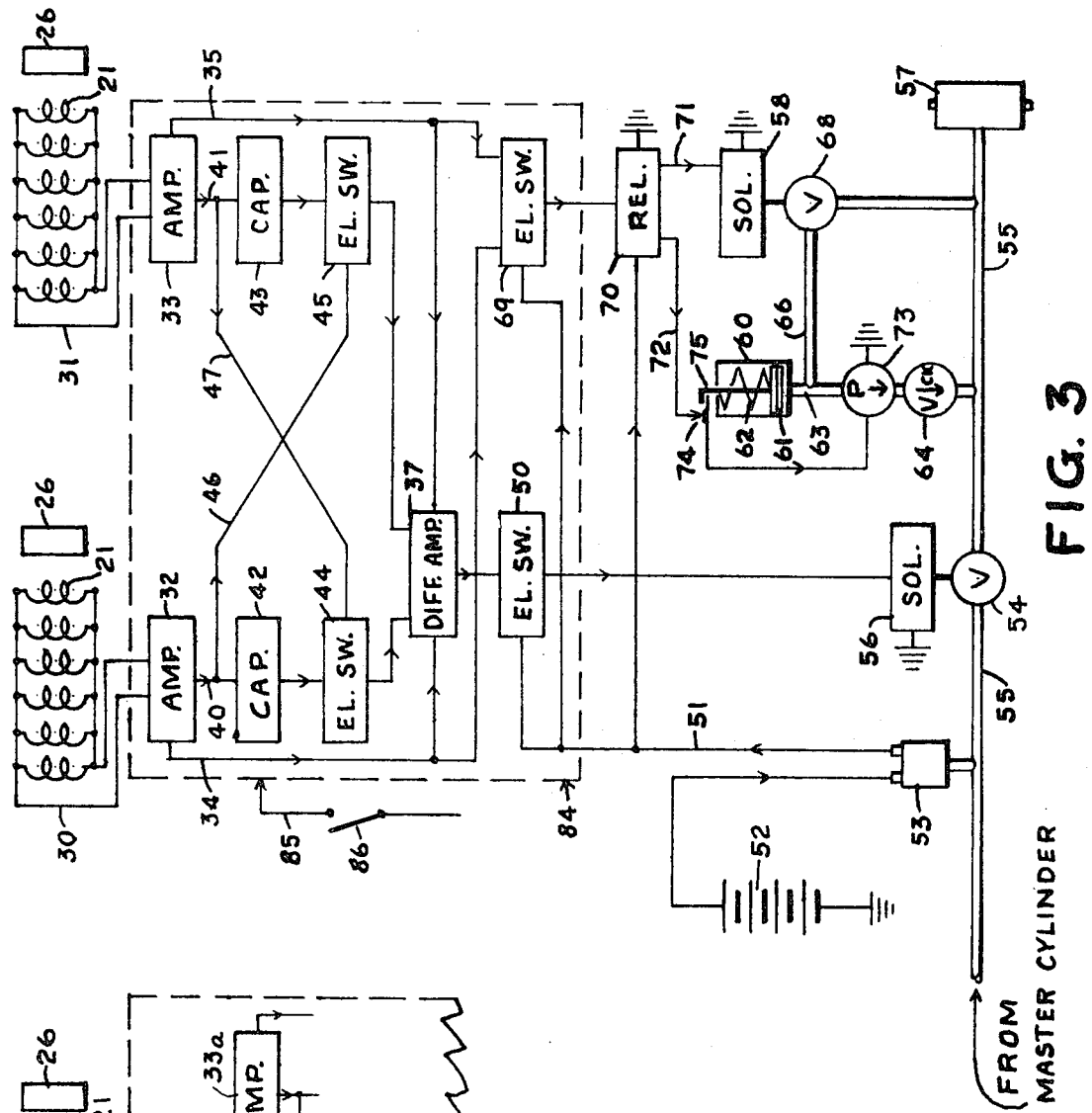
FIG. 3 is a circuit diagram of a system embodying the invention.

The circuit of FIG. 3 shows the means for measuring and utilizing these pulses. In this system alternate coils 21 are connected in one parallel circuit 30 and the other alternate coils 21 are connected in parallel in a second circuit 31. Hence the circuits 30 and 31 carry successive pulses alternately.

The circuits 30 and 31 are connected to amplifiers 32 and 33, respectively. Output circuits 34 and 35 of amplifiers 32 and 33 are fed to opposite branches of a differential amplifier 37. Output circuits 40 and 41 of amplifiers 32 and 33 are connected to charge capacitors 42 and 43 respectively which are connected through electronic switches 44 and 45 to opposite branches of the differential amplifier 37. Amplifiers 32 and 33 are also connected by lines 46 and 47 to the electronic switches 45 and 44 respectively. The arrangement is such that a pulse in line 30 amplified in the amplifier 32 serves to charge the capacitor 42, to energize one branch of the differential amplifier 37 and to make the electronic switch 45 conductive thereby discharging the capacitor 43 into the opposing branch of the differential amplifier. Hence the differential amplifier measures the difference between the pulse supplied by the circuit 30 and the previous pulse which was supplied by the circuit 31 to charge the capacitor 43. In a similar manner a pulse in the circuit 31 serves to charge the capacitor 43, to pulse the differential amplifier 37 and to discharge the capacitor 42 into the differential amplifier. The differential amplifier thus has an output which is proportional to the difference in amplitude of successive pulses.

The differential amplifier 37 is connected to actuate an electronic switch 50 to close a circuit 51 from the vehicle battery 52 through a pressure sensitive switch 53 to a solenoid 56 of a solenoid actuated valve 54 in the brake fluid line 55 which leads from the master cylinder to the wheel brake cylinder 57 on the vehicle wheel. The pressure sensitive switch is connected to be closed when pressure is applied to the fluid in the brake fluid line 55. The solenoid valve 54 is adapted to shut off the line 55 and block the wheel brake cylinder from the fluid pressure supplied by the brake pedal through the master cylinder.

Hence, when the valve 54 is closed, no further increase in fluid pressure can be applied to the wheel brake cylinder 57 but the pressure already developed in that cylinder is maintained. The braking force is accordingly maintained at the maximum value permissible without causing the wheel to develop skid conditions.

In the operation of the part of the system thus far described, if the wheel is accelerating or operating at a uniform rate as in normal driving the brake pedal is not being depressed, no fluid pressure is applied to the line 55 and the pressure sensitive switch 53 remains open. The brake system is free from the automatic control and there is no drain on the battery 52 other than to bias the integrated circuits. However, should brake pressure be applied to the line 55, the pressure sensitive switch 53 closes to set up the circuit 51 for operation in the manner above described.

When the output of the differential amplifier 37 does not exceed a value which represents excessive deceleration of the wheel, the electronic switch 50 does not close. When, however, the output exceeds such value the electronic switch 50 is actuated to close the battery circuit and thereby to close the solenoid actuated valve 54. The valve thus prevents further pressure from being built up in the wheel brake cylinder. This cylinder is held at the maximum permissible pressure for effective braking without skidding. This condition will hold as long as the amplitude of successive pulses exceeds the predetermined value.

When the pulses no longer have such different values, the output of the differential amplifier 37 would allow the electronic switch 50 to open and break the battery circuit to the solenoid actuated valve 54 which would allow the valve to open and reestablish fluid connection in the line 55 to the wheel brake cylinder 57. However in order to prevent such release of the valve 54 the electronic switch 50 may be made of the holding type so that when once closed it will remain closed until the battery circuit 51 is opened by the release of the brake pedal which reduces the pressure in the brake fluid line 55 and opens the pressure sensitive switch 53. Normal braking action is thus restored by release of the brake pedal.

By this system the operator is prevented from applying sufficient brake pressure to cause skid conditions to develop. However, in order to reduce the fluid pressure in the wheel brake cylinder in the event that the wheel substantially ceases rotation due, for example, to suddenly encountering an icy spot in the road, an accumulator cylinder 60 having a piston 61 which is held advanced by a spring 62 is connected by a pipe 63 having a one way check valve 64 to the fluid line 55 in the zone between the wheel brake cylinder 57 and the solenoid valve 54. The check valve 64 is oriented to allow fluid to be expelled from the cylinder 60 under the pressure of the spring 62 but to prevent fluid under pressure from entering the cylinder 60 from the line 55.

A pipe 66 having a solenoid actuated valve 68 is connected to bypass the check valve 64. The valve solenoid 58 is connected in the battery circuit 51 through a relay 70 which is actuated by the output of an electronic switch 69. The switch 69 is connected to be actuated by the outputs of pulse amplifiers 32 and 33 and is adapted to hold open the back contacts of relay 70 which are connected by line 71 to solenoid 58 when energized by appreciable pulses from the circuits 30 and 31, for thereby deenergizing solenoid 58 and maintaining valve 68 closed. When pulses of sufficient amplitude are no longer being received by the electronic switch 69, a condition which indicates that the wheel has substantially ceased rotating, the relay 70 is deenergized to close its back contacts and the valve 68 is opened by current from the battery line.

When the valve 68 is open, fluid is drained from the wheel brake cylinder into the accumulator cylinder 60 to relieve the fluid pressure in the wheel brake cylinder and thus to partially release the brake pressure so as to allow the wheel to again rotate. When pulses are received to again actuate the relay 70 its back contacts open and valve 68 closes. The front contacts of relay 70 are connected by a line 72 to a switch 74 which is actuated by piston rod 75 when the piston is retracted due to the admission of brake fluid into the cylinder 60 through the open valve 68. Switch 74 is connected to pump 73 which is disposed in the pipe 63 between cylinder 60 and check valve 64. The pump 73 operates to return the fluid from cylinder 60 through check valve 64 to brake cylinder 57 through line 55, thereby restoring the brake pressure. This cycle will be repeated to produce a pumping action of the brake until the wheel continues to rotate without interruption or until the fluid pressure in the line 55 is reduced sufficiently to open the pressure sensitive switch 53 by releasing the brake pedal. After switch 74 has been opened to stop the pump 73 by the advance of piston 61 and pressure in the line 55 has been reduced, any remaining fluid in cylinder 60 is returned through check valve 64 to line 55 through the action of spring 62. If the pumping action on the brake is not desired, pump 73 and its corresponding electrical circuit may be omitted in which case the system will still respond to a substantial reduction or cessation of pulses in the manner above described.

The system above described thus serves to limit and hold the fluid brake pressure at a value which is adapted to prevent incipient skid conditions from developing in normal braking operations, but should the wheel become momentarily locked due to a sudden reduction in road friction, the fluid pressure in the wheel brake cylinder is reduced until the condition is corrected.

Figure 4:
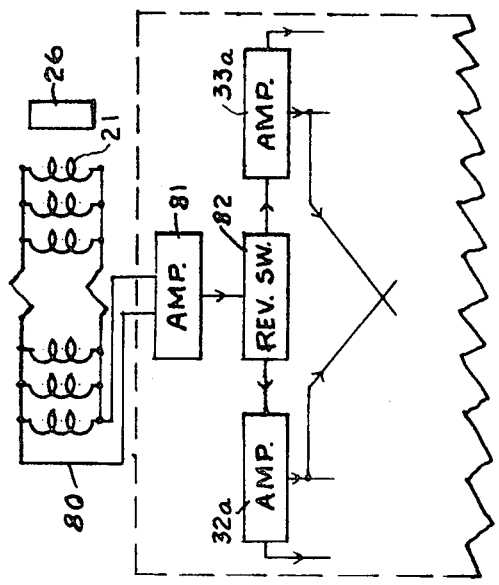
FIG. 4 is a similar circuit diagram illustrating a further embodiment of the invention.

In the embodiment of FIG. 4 the pulses are derived from a single pulse circuit. In this embodiment all of the coils 21 are connected in parallel in a circuit 80 which is connected to an amplifier 81. The output of the amplifier 81 is connected to an electronic reversing switch 82 which reverses at each pulse and connects alternate pulses to amplifier 32a and the other alternate pulses to amplifier 33a. The outputs of the amplifier 32a and 33a are connected to actuate circuits identical with those described above. The operation is similar to that of FIG. 3.

It is to be understood that the various amplifiers, relays and switches of the above system may be of the solid state type and may be embodied in a compact integrated circuit as indicated by the box 84. Also the circuit components may be biased by a line 85 which is connected through the ignition switch 86 of the vehicle. In this way the components will be energized whenever the vehicle is operating to produce the succession of pulses to the differential amplifier so that the system can respond immediately when the brake pedal is actuated to produce brake fluid pressure.

Figure 1:
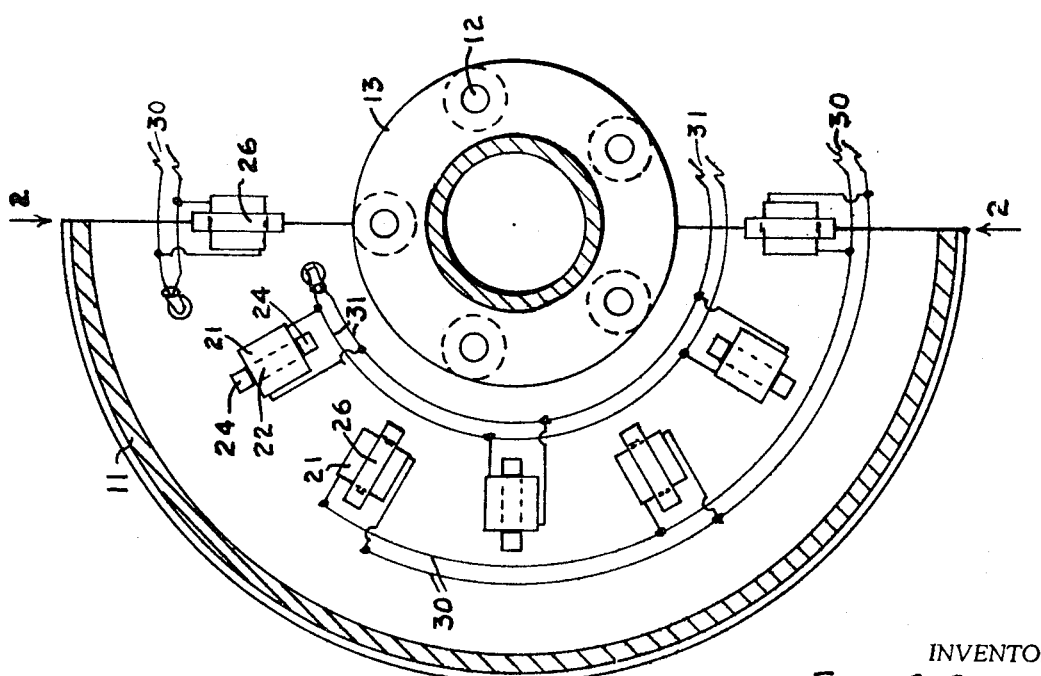
FIG. 1 is a partial sectional view taken on line 1—1 of FIG. 2 illustrating the present system as applied to the wheel of an automobile.

Although drum brakes have been indicated in FIGS. 1 and 2, the system is equally applicable to disc brakes and may be applied to the front wheel as well as the back wheels if desired.

What is claimed is:

1. A non-skid braking system for vehicles having fluid actuated wheel brakes, comprising pulse generating means rotating with a wheel of the vehicle and adapted to generate a series of pulses the amplitudes of which are proportional to the rate of rotation of said wheel means comparing the amplitudes of successive pulses of said series of pulses derived from said wheel, a brake fluid line adapted to supply fluid pressure for braking to said wheel brake cylinder and having a shut off valve, and means responsive to said comparing means to close said valve to thereby prevent further build up of pressure in the wheel brake cylinder when the difference in amplitudes of successive pulses of said series of pulses derived from said wheel exceeds a predetermined value, indicative of an excessive rate of deceleration of said wheel, said pulse generating means comprising a set of coils spaced peripherally and mounted in fixed positions around the axis of said wheel and a corresponding set of permanent magnets mounted to rotate with the wheel and disposed within the range of magnetic influence of said coils for producing electric pulses in the respective coils as the magnets are advanced by the rotation of said wheel.

2. A system as set forth in claim 1 including an accumulator cylinder, a line including a check valve connecting said fluid line to said cylinder, a bypass line for said check valve including a valve, and means responsive to the substantial absence of pulses to open said last valve for admitting fluid from said first line into said accumulator cylinder, for thereby reducing the fluid pressure in the wheel brake cylinder, and spring means restoring said fluid through said check valve into said first line when the fluid pressure in said first line is reduced.

3. A non-skid braking system as set forth in claim 2 including a pump connected to return brake fluid from said accumulator cylinder to said brake fluid line and means responsive to the restoration of said pulses and to the presence of fluid in said accumulator cylinder to cause actuation of said pump.

4. A system as set forth in claim 1 in which said comparing means includes a differential amplifier having a pair of branches, input circuits connected to supply alternate pulses to opposite branches of said amplifier, a pair of capacitors connected to said input circuits to be charged respectively by alternate pulses, discharge circuits connected to discharge said capacitors respectively to said branches, and switch means actuated by the respective pulses adapted to complete the discharge circuit to one of said branches when a pulse is being supplied directly to the other of said branches from said input circuit, so that the output signal from said differential amplifier is proportional to the difference in amplitude between successive pulses.

5. A system as set forth in claim 9 in which all of said coils are connected to a switch which is adapted to connect its output at successive pulses alternately to the respective branches.

6. A system as set forth in claim 4 in which a holding circuit is provided to maintain said valve closed until said fluid pressure is reduced.

7. A system as set forth in claim 4 in which said input circuits are connected respectively to alternate coils so that successive pulses are supplied to alternate input circuits, and include a pair of pulse amplifiers, the output of each such amplifier is connected to one of said branches of said differential amplifier and is also connected to charge one of said capacitors, and is connected to complete the discharge circuit from the other of said capacitors to the other of said branches so that the output signal from said differential amplifier is proportional to the difference in amplitude between successive pulses.

* * * * *

UNITED STATES PATENT OFFICE
CERTIFICATE OF CORRECTION

Patent No. 3,659,904          Dated May 2, 1972

Inventor(s) Fred C. Stevens

It is certified that error appears in the above-identified patent and that said Letters Patent are hereby corrected as shown below:

Column 4, line 68, claim reference numeral "9" should read -- 4 --.

Signed and sealed this 3rd day of October 1972.

(SEAL)
Attest:

EDWARD M. FLETCHER, JR.　　　　　　　　ROBERT GOTTSCHALK
Attesting Officer　　　　　　　　　　　　Commissioner of Patents